Sept. 22, 1959   B. C. PHILLIPS   2,905,327
FUEL FILTER
Filed April 3, 1958
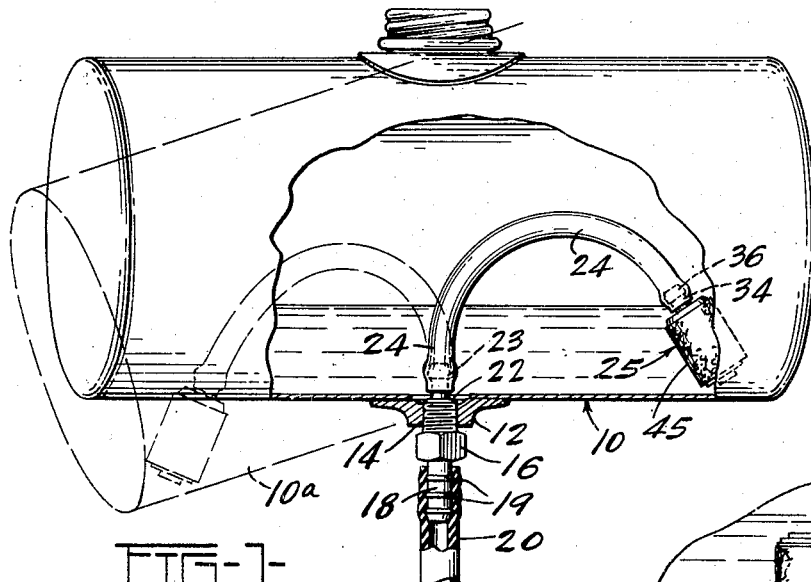
FIG-1-
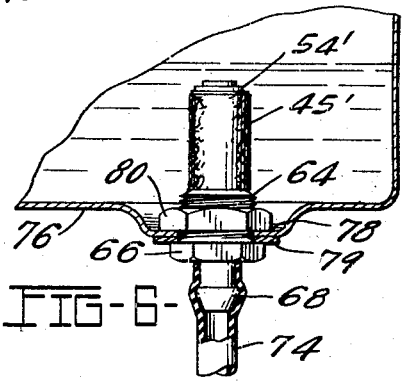
FIG-6-
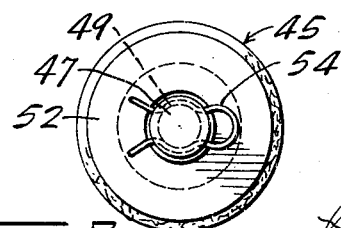
FIG-3-
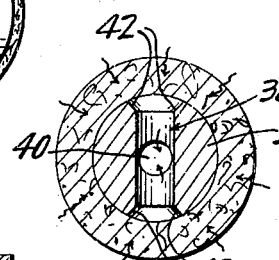
FIG-4-
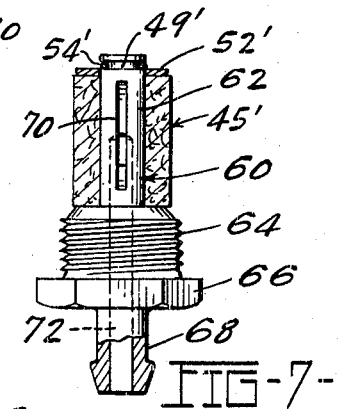
FIG-7-
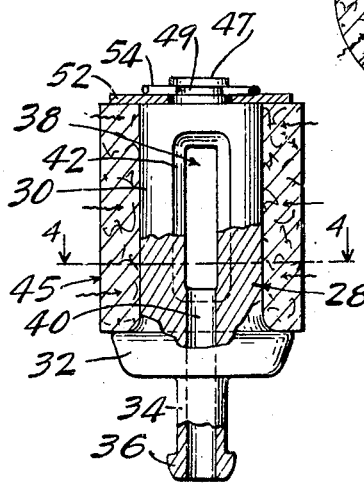
FIG-2-
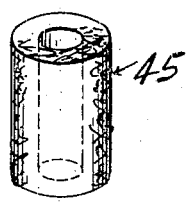
FIG-5-
INVENTOR:
BERNARD C. PHILLIPS.
BY
Harry O. Ernsberger
ATTORNEY

United States Patent Office

2,905,327
Patented Sept. 22, 1959

---

2,905,327

FUEL FILTER

Bernard C. Phillips, Toledo, Ohio, assignor to The Tillotson Manufacturing Company, Toledo, Ohio, a corporation of Ohio Application April 3, 1958, Serial No. 726,127

5 Claims. (Cl. 210—463)

This invention relates to filters and more especially to filtering means usable in fuel tanks containing hydrocarbon fuels for supplying filtered fuel to a charge forming device, carburetor or other fuel consuming instrumentalities.

Internal combustion engines and particularly those of small horse power utilized for powering chain saws, lawn mowers, percussion hammers, portable drilling devices and the like, must be adaptable for operation in extreme angular and, when used with chain saws, they must operate in inverted positions. Engines utilized for these purposes are provided with comparatively small fuel tanks mounted on the engine or in fixed relation thereto whereby the fuel tanks are moved to angular or inverted positions when the engines are moved to such positions. In order to provide a continuous supply of fuel for the charge forming device of the engine when the same is in angular or inverted positions, a fuel inlet fitting connected with a flexible hose is disposed in the fuel tank so that the inlet fitting moves to the lowest position in the fuel tank when the same is tilted or inverted.

In most installations and particularly for chain saw use, it is imperative that a filter be employed to prevent sawdust and foreign matter from entering the fuel line from the fuel tank to the charge forming device, and heretofore a metal cup has been attached to the flexible tube or hose in the tank which encloses a filter element. In order to assure immersion of the fuel inlet in the lowermost region of the tank, the metal cup is of sufficient weight to maintain the inlet region and the filter element contained within the metal cup immersed in the fuel.

In such constructions only the end area of the filter is exposed to the fuel, and with such comparatively small filter area, the effective filtering region quickly becomes clogged, necessitating frequent cleaning or replacement. Another disadvantage of this arrangement is that during rapid angular movements of the fuel tank such as occur in chain saw use, the metal cup or member enclosing the filter repeatedly strikes the interior surfaces of the tank wall and as such tanks are fashioned of relatively thin metal to reduce the weight factor, the impact of the cup often fractures the tank wall.

The present invention provides a filter unit especially adapted for use with fuel tanks embodying a flexible fuel supply tube or hose wherein the effective filtering area is greatly increased.

An object of the invention is the provision of a filter unit for use in a fuel tank wherein all of the exterior surface area of the filter element is effectively used for filter purposes.

Another object of the invention is the provision of a filter unit of a relatively movable character embodying a metallic fitting surrounded by a filter element formed of fibrous or nonmetallic resilient material whereby impacts of the filter element against the interior wall surfaces of a fuel tank are cushioned or absorbed by the filter element without injury or damage to the tank.

Another object of the invention is the provision of a filter unit of this character embodying a metal fitting of appreciable weight to assure immersion of the fuel inlet at the lowest region of the fuel tank which supports a resilient fibrous filter element in a manner whereby a substantial filter area is provided and, through the capillary action of the fibers of the filter, the fuel may be delivered from the tank until the supply is exhausted.

Another object of the invention is the provision of a filter having a comparatively large filter area presenting little or no restriction to fuel flow through the filter and, with a large filter area, dirt or foreign particles are not drawn deeply into the filter element but are agitated and washed from the filter by sloshing movement of the fuel in the tank whereby the filter is self cleaning for extended periods of use.

Another object of the invention is the provision of a fibrous filter element in a filter unit of this character which when wetted with a fuel and oil mixture such as is conventionally used in two-cycle engines, the filter is extremely repellant to absorption of water and prevents entrance of water into the fuel supply tube.

Still another object of the invention is the provision of a filter unit embodying a filter element which may be quickly and easily removed and replaced when required.

Still a further object of the invention is the provision of a filter unit which may be secured in an opening in the wall of a fuel tank utilized with engines which are not subjected to extreme angular or inverted positions.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a fuel tank with parts broken away showing a form of the invention installed in the tank;

Figure 2 is an elevational view showing a form of filter unit of the invention with certain parts illustrated in section;

Figure 3 is an end view of the construction shown in Figure 2;

Figure 4 is a sectional view taken substantially on the line 4—4 of Figure 2;

Figure 5 is an isometric view of the filter element;

Figure 6 is a sectional view of a fragment of a fuel tank illustrating a form of filter unit of the invention secured to the tank wall, and Figure 7 is an elevational view of the filter unit of Figure 6, certain parts being shown in section.

While the forms of the invention illustrated are especially adapted for use with fuel tanks employed with internal combustion engines of low horsepower especially usable for powering portable tools, it is to be understood that the filter unit of the invention may be employed wherever fuel filters may be used to advantage.

Referring to the drawings in detail and first with respect to Figure 1, there is illustrated a fuel tank or receptacle 10 fashioned of comparatively thin sheet metal which may be of circular cylindrical shape as illustrated in Figure 1 or may be of other suitable shape to facilitate a compact installation within an engine. The tank, when used with a portable type engine, may be fixedly secured or supported adjacent or upon the engine and is tilted whenever the engine is tilted.

An exemplary tilted position is indicated in broken lines at 10a. In the arrangement shown in Figure 1, the fuel conveying means or ducts are arranged whereby fuel flow may be maintained to the charge forming device or carburetor of the engine irrespective of a tilted or inverted position of the fuel tank. Welded or otherwise secured to the wall of the tank is a flanged boss 12 which is bored and threaded to receive a threaded portion 14 of a coupling member or fitting 16.

The portion of the member 16 exteriorly of the tank 10 is formed with a nipple 18 having its exterior surface provided with circular ridges 19 which receives an end region of a fuel conveying duct or flexible hose 20 arranged to be connected with the charge forming device or carburetor of an engine with which the arrangement is to be utilized. The raised ridges 19 serve to frictionally retain the hose 20 which may be fabricated of synthetic rubber or resinous material which is resistant to the effects of oils and hydrocarbon fuels.

The member 16 is formed with a second nipple portion or projection 22 extending into the tank 10 having an enlarged end portion 23 which is adapted to receive an end region of a flexible fuel conveying means or hose 24 which is frictionally held upon the nipple portion 22 through the enlarged portion 23 expanding the adjacent region of the hose. A form of filter unit 25 is adapted to be connected with the other end of the hose 24 to pass filtered fuel into the tube 24 for delivery to the charge forming device or carburetor.

With particular reference to Figures 2 through 5, a form of the filter unit of the invention is inclusive of a fitting or member 28 which is formed of metal and of sufficient weight so as to immerse the filter unit in the fuel in the tank and retain the unit in such position. The fitting 28 may be formed of brass, die cast metal or other metal which is noncorrosive in oils and hydrocarbon fuels. The fitting 28 is provided with a filter support or supporting portion 30 which is preferably circular cylindrical in shape and an outwardly extending flange or ledge 32 at one end of portion 30 the flange portion being provided with a hollow nipple or tenon 34.

The end region of the nipple 34 is provided with an enlarged circular ridge 36, the end of the tube 24 being received over the ridge 36 and onto the nipple portion 34 in the manner shown in Figure 1. The filter supporting portion 30 is formed with transverse passage means or elongated slot 38 which extends diametrically through the portion 30 and is in communication with a passage or opening 40 extending through the flange portion 32 and the nipple portion 34 as shown in Figure 2.

The surface area of the passage 38 adjacent the surface of the filter supporting portion 30 may be enlarged by chamfering the walls of the passage as shown at 42 so as to provide substantial open area adjacent the interior of a filter element 45 for facilitating flow of fuel or fuel and oil mixture into the transverse passage 38. The hollow cylindrically shaped filter element 45 is adapted to be slidably received upon the filter supporting portion 30 to the position illustrated in Figure 2 wherein one end region of the filter element engages the ledge 32.

The end region of the filter supporting portion 30 opposite the flange 32 is provided with a tenon 47 formed with a circular recess 49 to accommodate a securing means. In assembling the filter element or means 45 with the fitting 28, the filter 45 is slidably received upon or telescoped with the supporting portion 30 until it occupies the position shown in Figure 2. A circular disk or washer 52 is disposed on the tenon 47, the washer being of a dimension to overlie the end region of the filter element 45 to prevent displacement of the filter element. The felt is preferably made slightly longer than the filter supporting portion 30 so that the felt is maintained under slight lengthwise compression for sealing purposes after its assembly on the support 30.

After the disk 52 is positioned as shown in Figure 2, a retaining clip or securing means 54 of the hairpin type is slidably inserted into the recess 49 and is maintained in the position shown in Figures 2 and 3 by its resilient characteristics. In this manner the filter element 45 is securely maintained in a position surrounding the filter supporting portion 30.

The filter element 45 may be made of wool felt or other fibrous or nonmetallic material having a degree of resiliency so that when the filter element 45 is impinged against the wall of the fuel tank, the shock will be cushioned or absorbed through the resiliency of the filter element. The metal fitting 28 is of sufficient weight to overcome the relative stiffness of the flexible tube 24 so that the filter unit will gravitate toward the lowest zone in the tank 10.

The tube or hose 24 which may be made of synthetic rubber or other elastomeric resinous material tends to become stiffened or of reduced flexibility at zero or sub-zero temperatures and the fitting must be of sufficient weight to overcome the stiffness of the hose. It is found that for most installations a metal fitting 28 of a weight of approximately an ounce is sufficient to overcome the stiffness of the flexible hose 24 at sub-zero temperatures and gravitate to the lowest region within the tank.

With the entire exterior surface area of the filter element 45 exposed and in contact with the fuel, the filtering area is many times that of prior devices.

Due to a large filtering area, the fuel flow through the filter is of relatively low velocity and hence sawdust, dirt and foreign particles are not drawn deeply into the filter but are entrapped or blocked at the surface area, and may be agitated and washed away by the sloshing action of the fuel in the tank. Hence the filter to a substantial degree is self cleaning.

When the filter element becomes thoroughly wetted or impregnated with fuel or fuel and oil mixture, the filter becomes highly resistant to water absorption and will pass the fuel or fuel mixture and impede movement of moisture or water, so that a moisture-free fuel is delivered to the carburetor or charge forming device. The filter element 45 may be quickly removed and replaced by withdrawing the spring clip 54 from the recess 49 and removing the washer 52, after which the filter element may be slidably removed from its support 30.

While the filter element may be made of a size to facilitate unrestricted flow of fuel to satisfy the fuel requirements of an engine, it has been found that a filter element formed of wool felt or the like of about thirteen-sixteenths of an inch in diameter and one inch long is adequate for filtering fuel at the flow rate required by an engine utilized for chain saws, outboard motors, lawn mowers and the like.

The filter unit of the invention may be installed in a fixed position within a fuel tank, and a filter unit and exemplary installation of this character are illustrated in Figures 6 and 7. In this form of construction, the filter unit includes a fitting 60 formed with a filter supporting means or portion 62, a threaded portion 64, a polygonally shaped portion 66, and a nipple portion 68.

The filter element 45' of the same type as the element 45 is supported upon the portion 62 in the same manner as in the form of the invention shown in Figure 2, the supporting portion 62 extending beyond the end of the filter element 45' and fashioned with a recess 49' which receives a spring clip 54' adapted to secure the washer 52' and filter element 45' in assembled relation on the support 62. The filter supporting portion 62 is formed with an elongated transverse passage 70 which is in communication with a passage 72 extending through the portions 64, 66 and the nipple 68, for conveying fuel filtered through the element 45' into a fuel line or hose 74 telescoped on the nipple portion 68.

The wall of the fuel tank 76 is preferably formed with a depressed portion 78 having an opening to accommodate the threaded portion 64. A sealing gasket 79 is disposed between the flange or polygonal portion 66 and the exterior surface of the tank and a nut 80 is threaded onto the portion 64 which is tightly drawn up in contact with the interior surface of the tank wall whereby the filter unit is fixedly supported within the tank.

The depressed region 78 is provided so that the filter unit 45' may be disposed near the bottom of the tank to enable fuel to flow through the filter when only a small amount of fuel is in the tank.

While it is preferable to fashion the filter means 45' as a single element, the filter means may be a series of short length filters assembled in end-to-end relation on the filter supporting means. Such a multisection filter functions in substantially the same manner as a single filter element.

The fitting 28 may be fabricated of materials other than metals, such as zinc, brass or the like. For example, the fitting may be molded of plastic material which is resistant to hydrocarbon fuels and oils, such as polychloroprene, known by the trade name Neoprene, or other such material having a specific gravity of approximately 1.0 or of a higher specific gravity than the fuel in which the filter unit is to be immersed.

It is apparent that, within the scope of the invention, modifications and different arrangements may be made other than is herein disclosed, and the present disclosure is illustrative merely, the invention comprehending all variations thereof.

I claim:

1. A filter unit of the character disclosed, in combination, a metal fitting formed with an elongated filter supporting portion and a nipple portion, transverse passage means of substantial area formed in the filter supporting portion, an axial passage in said nipple portion in communication with the transverse passage means, an annularly shaped filter element of fibrous material surrounding and snugly engaging the filter supporting portion having its exterior peripheral surface exposed, a circular flange formed on said fitting, one end of said filter element engaging said flange defining the lengthwise position of the filter element on the supporting portion, and means cooperating with an end region of the filter supporting portion and engageable with the other end of the filter element for retaining the same on the supporting portion.

2. A filter unit of the character disclosed, in combination, a metal fitting formed with a circular flange portion, an elongated filter supporting portion extending in one direction from the flange portion and a nipple portion extending in an opposite direction from the flange portion, a transverse slot of substantial area formed in the filter supporting portion, an axial passage in said nipple and flange portions in communication with the transverse slot, an annularly shaped filter element of wool felt surrounding the filter supporting portion having its exterior peripheral surface exposed, said filter supporting portion having a tenon projecting beyond an end of the filter element, and removable means cooperating with said tenon for retaining the filter element on the supporting portion.

3. A filter for use with a fuel tank including, in combination, a fitting formed of material of a specific gravity of at least 1.0 and provided with a hollow nipple portion and a cylindrical filter supporting portion, said nipple portion being adapted to be connected with a fuel conveying tube, an annularly-shaped filter element formed of nonmetallic felted fibers surrounding and snugly engaging the filter supporting portion and having its exterior area exposed, said filter supporting portion being formed with a transverse slot elongated in a lengthwise direction of the filter supporting portion in communication with the hollow nipple portion, said filter supporting portion extending beyond the filter element, and means cooperating with the portion of the filter supporting portion extending beyond the filter element for retaining the filter on the filter supporting portion.

4. A fuel filter of the character disclosed including, in combination, a metal fitting provided with a hollow coupling portion and a cylindrically-shaped filter supporting portion, said coupling portion being adapted to be connected with a fuel conveying tube, an annular filter element formed of felted fibers telescoped on the cylindrically-shaped filter supporting portion and having its exterior surface exposed to present a large filter area, said filter supporting portion being formed with transverse slot elongated lengthwise of the filter supporting portion and in communication with the hollow interior of the coupling portion, a flange on said fitting disposed between the coupling portion and the filter supporting portion, one end of the filter element engaging said flange, a tenon formed on the end of the filter supporting portion, and removable means associated with the tenon and engaging the opposite end of the filter element for retaining the filter element on the filter supporting portion.

5. A fuel filter unit of the character disclosed in combination, a metal fitting formed with a cylindrically-shaped filter supporting portion and a hollow nipple portion, a circular flange formed on said fitting and disposed between the filter supporting portion and the nipple portion, said filter supporting portion being formed with a diametrically disposed slot elongated in the direction of the length of the filter supporting portion providing an open area in communication with the passage in the nipple portion, said nipple portion being shaped to receive a flexible fuel conveying tube, a hollow cylindrically-shaped filter formed of felted fibers telescoped on said filter supporting portion, one end of said filter means engaging the circular flange, the filter supporting portion being formed with a tenon extending beyond an end of the filter means, a filter retaining plate on said tenon, and a removable clip engaging the tenon adapted to hold the plate in engagement with the filter means.

References Cited in the file of this patent
UNITED STATES PATENTS 1,378,929    Wurscher _____ May 24, 1921